(12) United States Patent
Huang

(10) Patent No.: US 10,742,875 B2
(45) Date of Patent: Aug. 11, 2020

(54) ELECTRONIC DEVICE AND IMAGE CAPTURE CONTROL METHOD FOR A DUAL CAMERA ASSEMBLY THAT FUSES IMAGES IF AN ISO VALUE OF THE CAMERA ASSEMBLY IS GREATER THAN OR EQUAL TO A FIRST PRESET VALUE

(71) Applicant: Chiun Mai Communication Systems, Inc., New Taipei (TW)

(72) Inventor: Yi-Jen Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/021,184

(22) Filed: Jun. 28, 2018

(65) Prior Publication Data
US 2019/0052802 A1 Feb. 14, 2019

(30) Foreign Application Priority Data
Aug. 11, 2017 (TW) .............................. 106127394 A

(51) Int. Cl.
*H04N 5/228* (2006.01)
*H04N 5/232* (2006.01)
*H04N 5/225* (2006.01)
*H04N 5/235* (2006.01)
*H04N 9/04* (2006.01)

(52) U.S. Cl.
CPC ....... *H04N 5/23229* (2013.01); *H04N 5/2253* (2013.01); *H04N 5/2254* (2013.01); *H04N 5/2353* (2013.01); *H04N 5/2354* (2013.01); *H04N 5/23248* (2013.01); *H04N 5/23287* (2013.01); *H04N 9/045* (2013.01)

(58) Field of Classification Search
CPC .................................................. H04N 5/2354
See application file for complete search history.

(56) References Cited

FOREIGN PATENT DOCUMENTS

| | | | |
|---|---|---|---|
| CN | 102480593 | A | 5/2012 |
| CN | 102480593 | A | 5/2012 |
| CN | 106375602 | A | 2/2017 |
| CN | 106454077 | A | 2/2017 |
| CN | 206042072 | U | 3/2017 |
| CN | 206042072 | U | 3/2017 |
| CN | 106572246 | A | 4/2017 |
| TW | M545928 | U | 7/2017 |

*Primary Examiner* — Gary C Vieaux
(74) *Attorney, Agent, or Firm* — ScienBiziP, P.C.

(57) ABSTRACT

An electronic device including a camera assembly, a storage, and a processor is disclosed. The camera assembly includes a first camera unit and a second camera unit. The processor is configured to obtain an ISO value of the camera assembly when the camera assembly is activated and determine whether the ISO value is greater than or equal to a first preset value. The processor is also configured to control, when the ISO value is greater than or equal to the first preset value, the first camera unit and the second camera unit to separately capture a first image and a second image, respectively, fuse the first image and the second image to generate a third image, and store the third image in the storage. An image capture control method implemented in the electronic device is also disclosed.

13 Claims, 5 Drawing Sheets

ELECTRONIC DEVICE AND IMAGE CAPTURE CONTROL METHOD FOR A DUAL CAMERA ASSEMBLY THAT FUSES IMAGES IF AN ISO VALUE OF THE CAMERA ASSEMBLY IS GREATER THAN OR EQUAL TO A FIRST PRESET VALUE

CROSS-REFERENCE TO RELATED APPLICATIONS

This application claims priority to Chinese Patent Application No. 106127394 filed on Aug. 11, 2017, the contents of which are incorporated by reference herein.

FIELD

The subject matter herein generally relates to image capture technology, and more particularly to an image capture control method implemented in an electronic device.

BACKGROUND

More mobile devices such as smart phones include a dual camera module for enhancing image quality and performance. Therefore, the operation of a dual camera module in mobile devices becomes more important.

BRIEF DESCRIPTION OF THE DRAWINGS

Implementations of the present disclosure will now be described, by way of example only, with reference to the attached figures.

DETAILED DESCRIPTION

Figure 1:
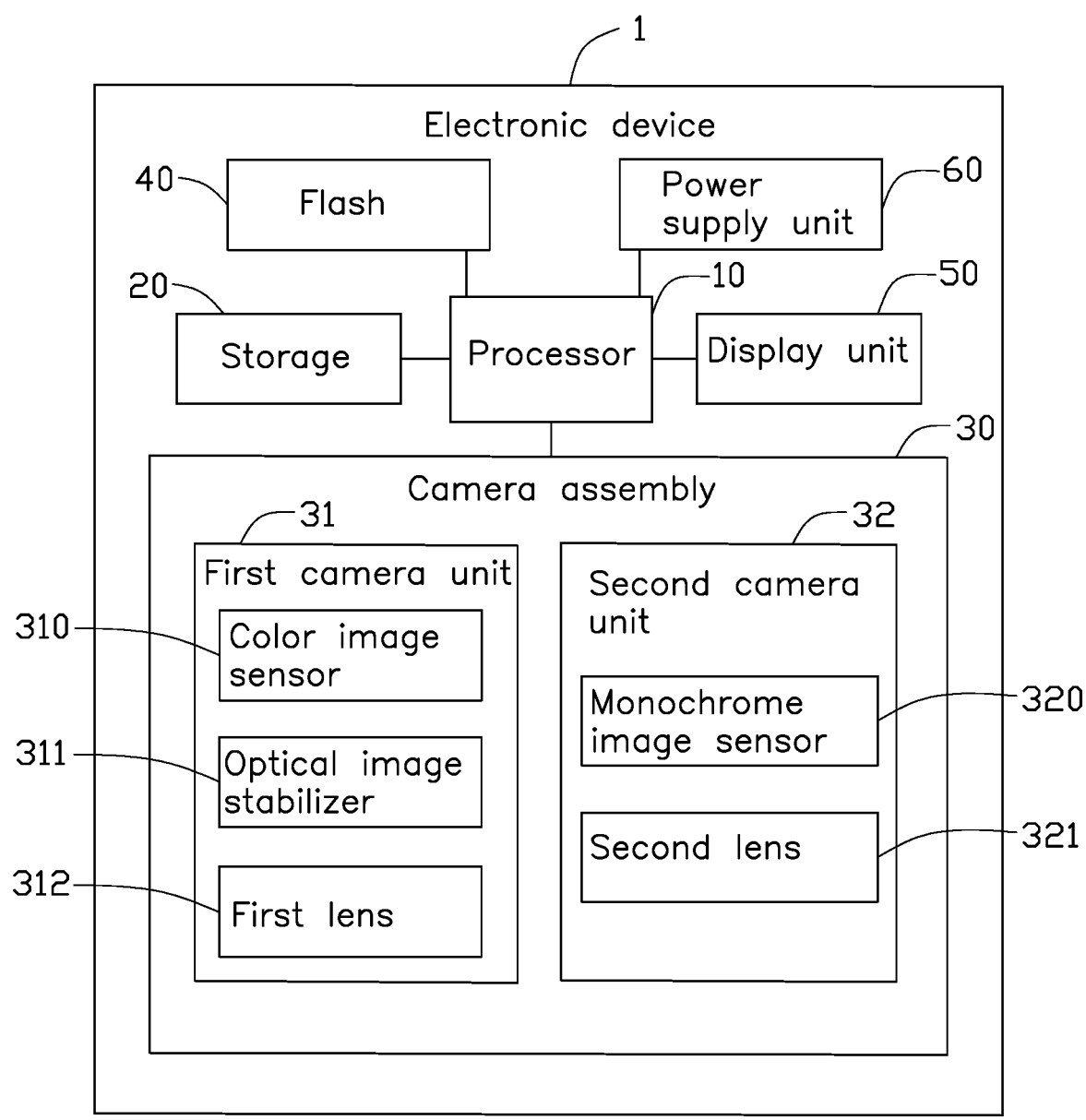
FIG. 1 is a diagram of an exemplary embodiment of an electronic device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of an electronic device 1. The electronic device 1 can be a mobile phone, a tablet computer, a personal digital assistant, or other portable electronic device. The electronic device 1 includes, but is not limited to, a processor 10, a storage 20, a camera assembly 30, a flash 40, a display unit 50, and a power supply unit 60.

The storage 20 can be a read-only memory, a random access memory, or an external storage device, such as a magnetic disk or hard disk. The storage 20 can store images captured by the camera assembly 30.

The camera assembly 30 includes a first camera unit 31 and a second camera unit 32. In at least one embodiment, the first camera unit 31 includes a color image sensor 310, an optical image stabilizer 311, and a first lens 312. The optical image stabilizer 311 is configured to provide an optical image stabilizing function. The second camera unit 32 includes a monochrome image sensor 320 and a second lens 321.

The flash 40 is configured to provide light for the camera assembly 30 to capture images in a darker environment. In at least one embodiment, the display unit 50 is a touch screen display for providing display function for the electronic device 1. In at least one embodiment, the power supply unit 60 is a rechargeable lithium battery for providing power for the electronic device 1.

Figure 2:
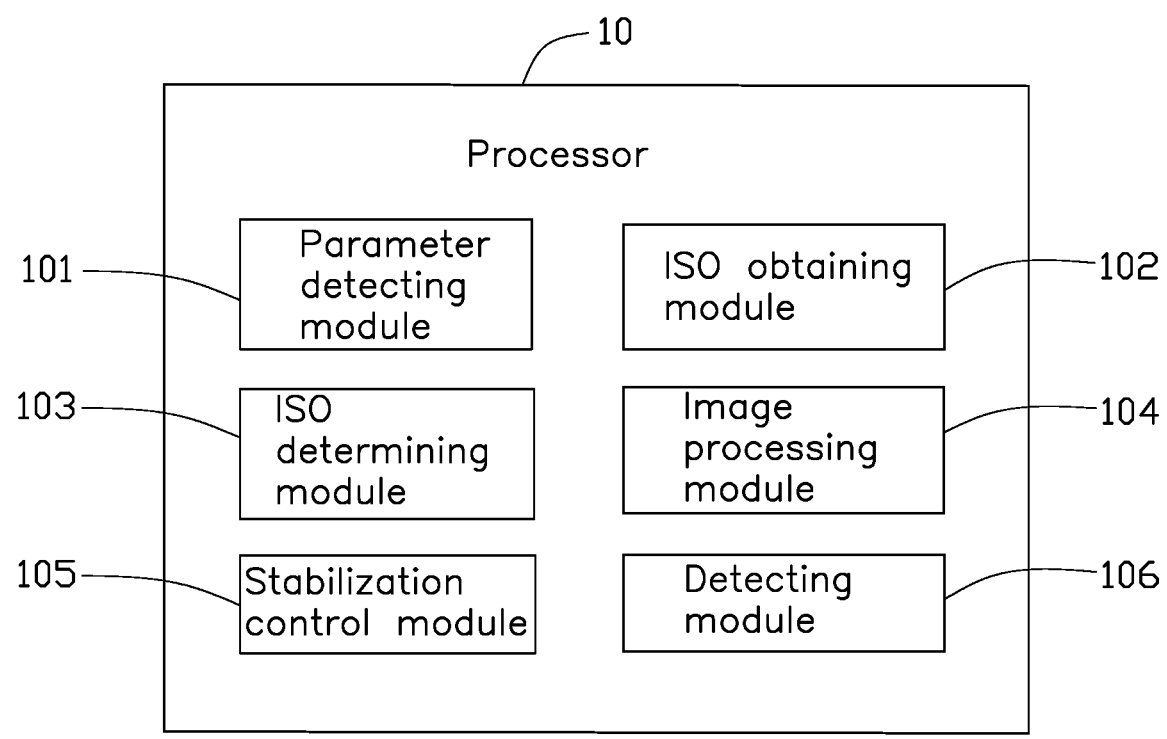
FIG. 2 is a diagram of function modules executed by a processor of FIG. 1.

Referring to FIG. 2, the processor 10 includes at least a parameter detecting module 101, an ISO obtaining module 102, an ISO determining module 103, an image processing module 104, a stabilization control module 105, and a detecting module 106. The storage 20 can store the modules 101-106, and the modules 101-106 can be executed by the processor 10. In another embodiment, the modules 101-106 can be firmware embedded in the processor 10. The modules 101-106 can include one or more software programs in the form of computerized codes stored in the storage 20. The computerized codes can include instructions executed by the processor 10 to provide functions for the modules 101-106.

When the camera assembly 30 is activated, the parameter detecting module 101 detects operational parameters of the first camera unit 31 and the second camera unit 32 and synchronizes the operational parameters of the second camera unit 32 with the operational parameters of the first camera unit 31. The operational parameters of the second camera unit 32 synchronized with the operational parameters of the first camera unit 31 can facilitate image fusion of images captured by the first camera unit 31 and the second camera unit 32. In at least one embodiment, the operational parameters include, but are not limited to, auto focus parameters, auto exposure parameters, and auto white balance parameters.

The ISO obtaining module 102 is configured to obtain an ISO value of the camera assembly 30.

The ISO determining module 103 is configured to determine whether the obtained ISO value is greater than or equal to a first preset value. In at least one embodiment, the first preset value is 800. In other embodiments, the first preset value can be any of other appropriate values.

In a first embodiment, when the ISO value is greater than or equal to the first preset value, the image processing module 104 controls the first camera unit 31 and the second camera unit 32 to separately capture a first image and a second image, respectively, fuses the first image and the second image to generate a third image, and stores the third image in the storage 20.

In the first embodiment, the first image captured by the first camera unit 31 is a color image, and the second image captured by the second camera unit 32 is a monochrome image. The image processing module 104 fuses the color image and the monochrome image to generate the third image thereby improving quality and brightness of the color image. A process of fusing images is known in the art.

The stabilization control module 105 activates the optical image stabilizer 311 when the ISO value is less than the first preset value. The optical image stabilizer 311 is a lens module capable of compensating shaking and movement of the first lens 312, so that a blurry image captured by the first camera unit 31 being shaken can be avoided.

When the ISO value of the camera assembly 30 is less than the first preset value, the image processing module 104 controls the first camera unit 31 to capture a fourth image and stores the fourth image in the storage 20.

In a second embodiment, when the ISO value is greater than or equal to the first preset value, the detecting module 106 detects whether a high-dynamic range (HDR) function of the first camera unit 31 is activated.

When the HDR function is activated, the stabilization control module 105 activates the optical image stabilizer 311 of the first camera unit 31, and the image processing module 104 controls the first camera unit 31 to capture the fourth image and stores the fourth image in the storage 20.

When the HDR function is not activated, the image processing module 104 controls the first camera unit 31 and the second camera unit 32 to separately capture the first image and the second image, respectively, fuses the first image and the second image to generate the third image, and stores the third image in the storage 20.

In a third embodiment, when the ISO value of the camera assembly 30 is greater than or equal to the first preset value, the detecting module 106 detects whether the flash 40 is activated.

When the flash 40 is activated, the stabilization control module 105 activates the optical image stabilizer 311 of the first camera unit 31, and the image processing module 104 controls the first camera unit 31 to capture the fourth image and stores the fourth image in the storage 20.

When the flash 40 is not activated, the image processing module 104 controls the first camera unit 31 and the second camera unit 32 to separately capture the first image and the second image, respectively, fuses the first image and the second image to generate the third image, and stores the third image in the storage 20.

In a fourth embodiment, when the ISO value of the camera assembly 30 is greater than or equal to the first preset value, the detecting module 106 detects whether the HDR function of the first camera unit 31 is activated.

When the HDR function of the first camera unit 31 is activated, the stabilization control module 105 activates the optical image stabilizer 311 of the first camera unit 31, and the image processing module 104 controls the first camera unit 31 to capture the fourth image and stores the fourth image in the storage 20.

When the HDR function of the first camera unit 31 is not activated, the detecting module 106 detects whether the flash 40 is activated.

When the flash 40 is activated, the stabilization control module 105 activates the optical image stabilizer 311 of the first camera unit 31, and the image processing module 104 controls the first camera unit 31 to capture the fourth image and stores the fourth image in the storage 20.

When the flash 40 is not activated, the image processing module 104 controls the first camera unit 31 and the second camera unit 32 to separately capture the first image and the second image, respectively, fuses the first image and the second image to generate the third image, and stores the third image in the storage 20.

Furthermore, the determining module 103 determines whether the ISO value of the camera assembly 30 is greater than or equal to a second preset value. The second preset value is greater than the first preset value. In at least one embodiment, the second preset value is 1600. In other embodiment, the second preset value can be any of other appropriate values.

When the ISO value of the camera assembly 30 is greater than or equal to the second preset value, the detecting module 106 detects whether the flash 40 is activated.

When the flash 40 is activated, the stabilization control module 105 activates the optical image stabilizer 311 of the first camera unit 31, and the image processing module 104 controls the first camera unit 31 to capture the fourth image and stores the fourth image in the storage 20.

When the flash 40 is not activated, the detecting module 106 detects whether the HDR function of the first camera unit 31 is activated.

When the HDR function of the first camera unit 31 is activated, the stabilization control module 105 activates the optical image stabilizer 311 of the first camera unit 31, and the image processing module 104 controls the first camera unit 31 to capture the fourth image and stores the fourth image in the storage 20.

When the HDR function of the first camera unit 31 is not activated, the image processing module 104 controls the first camera unit 31 and the second camera unit 32 to separately capture the first image and the second image, respectively, fuses the first image and the second image to generate the third image, and stores the third image in the storage 20.

Figure 3:
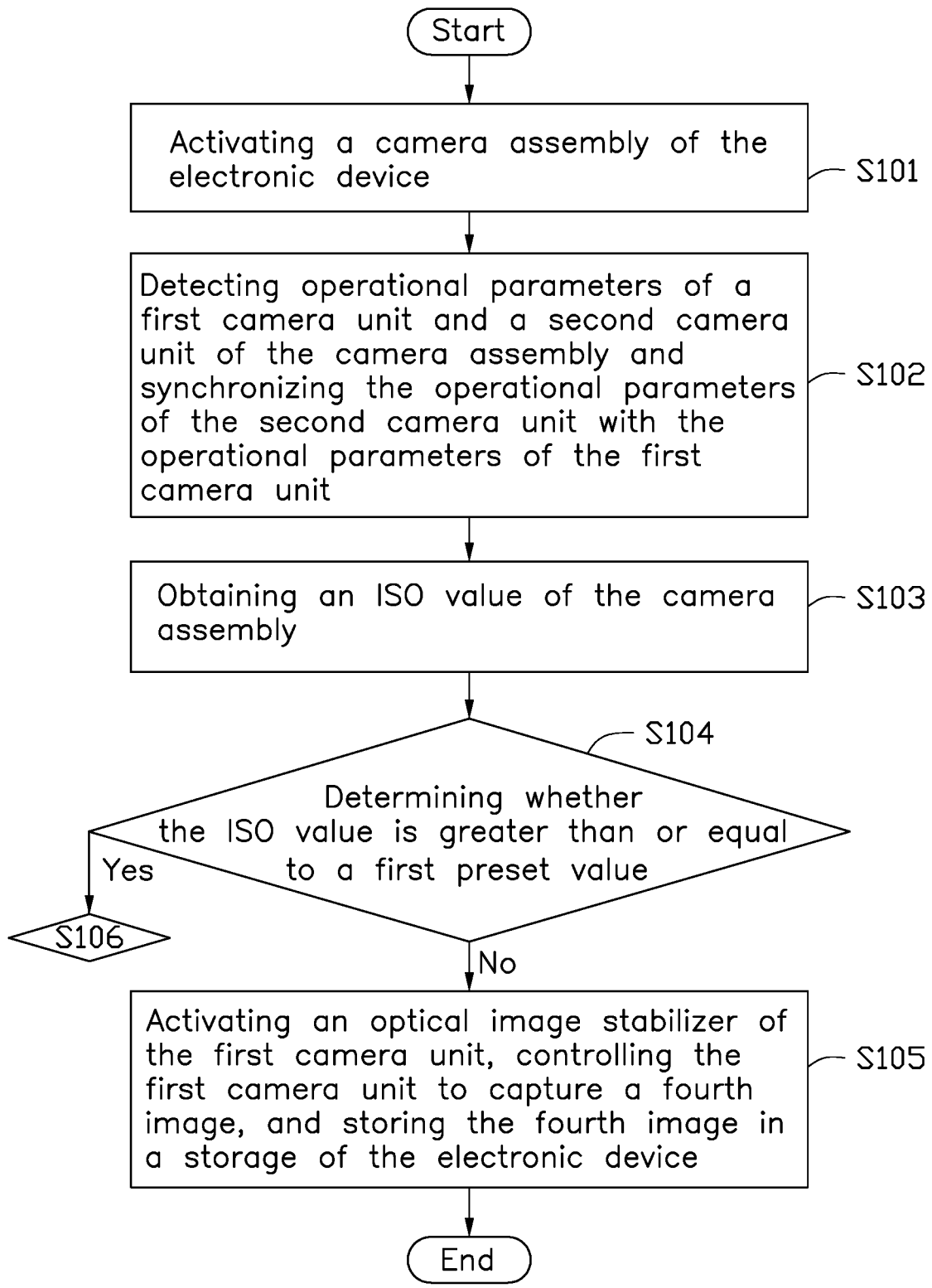
FIGS. 3-5 are a flow chart of an image capture control method.
Figure 4:
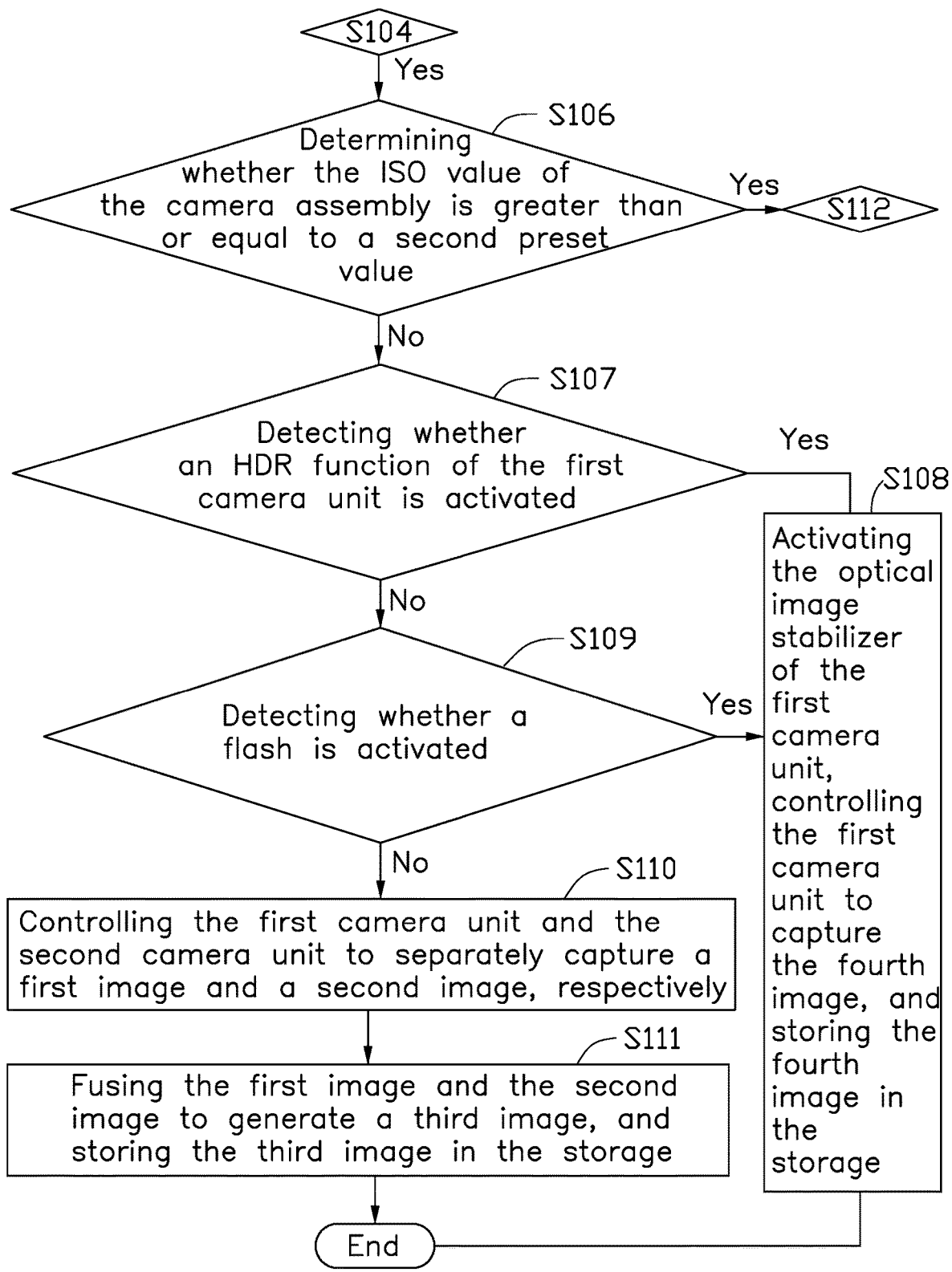
Figure 5:
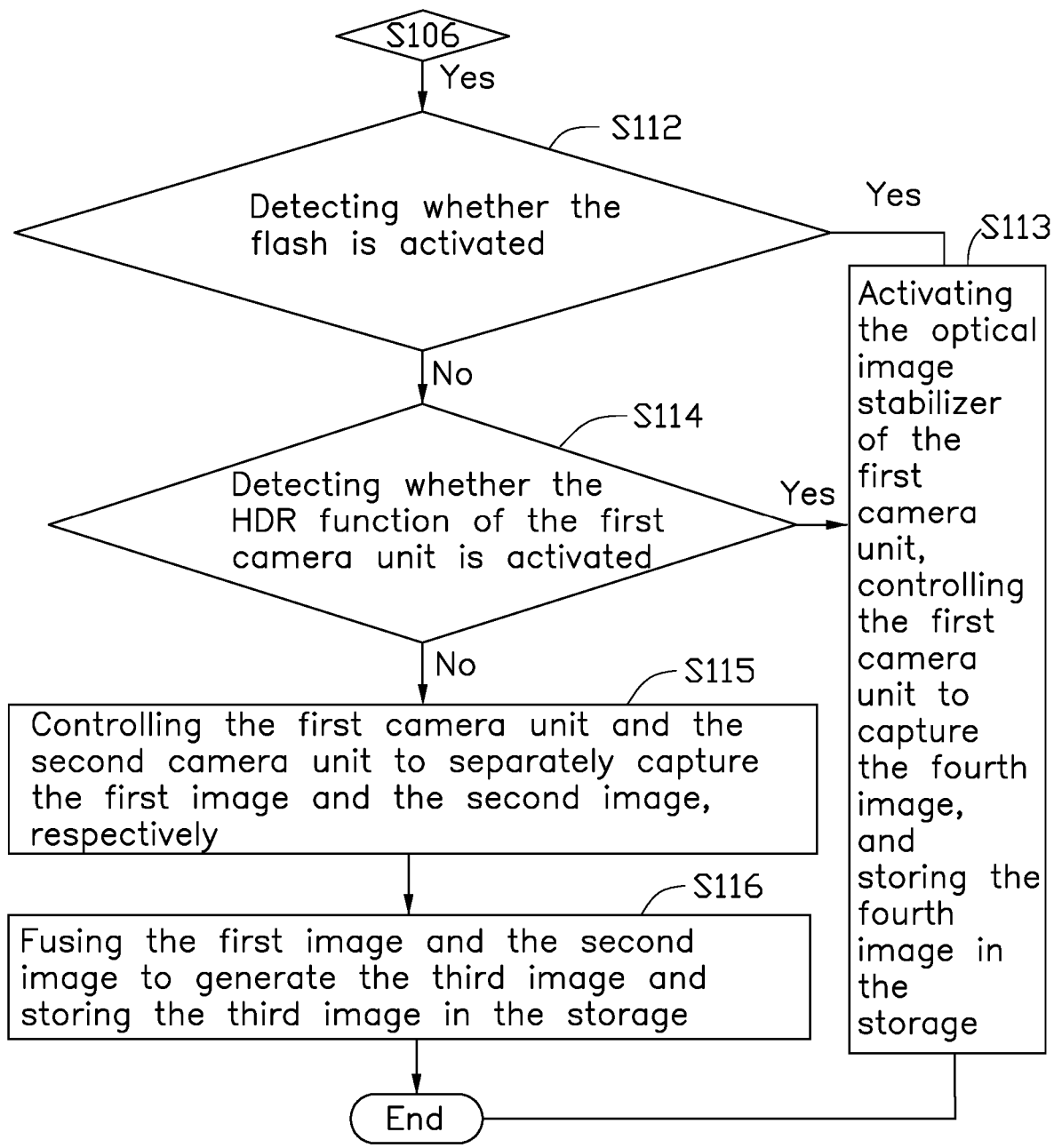

FIGS. 3-5 illustrate a flowchart of an exemplary image control method implemented in an electronic device. The example method is provided by way of example, as there are a variety of ways to carry out the method. The method described below can be carried out using the configurations illustrated in FIGS. 1-2, for example, and various elements of these figures are referenced in explaining the example method. Each block shown in FIGS. 3-5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S101.

At block S101, a camera assembly 30 of the electronic device is activated.

At block S102, operational parameters of a first camera unit 31 and a second camera unit 32 of the camera assembly 30 are detected, and the operational parameters of the second camera unit 32 are synchronized with the operational parameters of the first camera unit 31.

At block S103, an ISO value of the camera assembly 30 is obtained.

At block S104, whether the ISO value is greater than or equal to a first preset value is determined. When the ISO value is less than the first preset value, block S105 is implemented. When the ISO value is greater than or equal to the first preset value, block S106 is implemented.

At block S105, an optical image stabilizer 311 of the first camera unit 31 is activated, the first camera unit 31 is controlled to capture a fourth image, and the fourth image is stored in a storage 20 of the electronic device.

At block S106, whether the ISO value of the camera assembly 30 is greater than or equal to a second preset value is determined. When the ISO value is less than the second preset value, block S107 is implemented. When the ISO value is greater than or equal to the second preset value, block S112 is implemented.

At block S107, whether an HDR function of the first camera unit 31 is activated is detected. When the HDR function is activated, block S108 is implemented. When the HDR function is not activated, block S109 is implemented.

At block S108, the optical image stabilizer 311 of the first camera unit 31 is activated, the first camera unit 31 is controlled to capture the fourth image, and the fourth image is stored in the storage 20.

At block S109, whether a flash 40 of the electronic device is activated is detected. When the flash 40 is activated, block S108 is implemented. When the flash 40 is not activated, block S110 is implemented.

At block S110, the first camera unit 31 and the second camera unit 32 are controlled to separately capture a first image and a second image, respectively.

At block S111, the first image and the second image are fused to generate a third image, and the third image is stored in the storage 20.

At block S112, whether the flash is activated is detected. When the flash is activated, block S113 is implemented. When the flash is not activated, block S114 is implemented.

At block S113, the optical image stabilizer 311 of the first camera unit 31 is activated, the first camera unit 31 is controlled to capture the fourth image, and the fourth image is stored in the storage 20.

At block S114, whether the HDR function of the first camera unit is activated is detected. When the HDR function is activated, block S113 is implemented. When the HDR function is not activated, block S115 is implemented.

At block S115, the first camera unit 31 and the second camera unit 32 are controlled to separately capture the first image and the second image, respectively.

At block S116, the first image and the second image are fused to generate the third image, and the third image is stored in the storage 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
   a camera assembly comprising a first camera unit and a second camera unit;
   a storage; and
   a processor configured to:
      if the camera assembly is activated, detect operational parameters of the first camera unit and the second camera unit;
      synchronize the operational parameters of the second camera unit with the operational parameters of the first camera unit;
      obtain an ISO value of the camera assembly;
      determine whether the ISO value is greater than or equal to a first preset value, wherein
      if the ISO value is greater than or equal to the first preset value, control the first camera unit and the second camera unit to separately capture a first image and a second image, respectively, fuse the first image and the second image to generate a third image, and store the third image in the storage.

2. The electronic device of claim 1, wherein the first camera unit comprises a color image sensor, an optical image stabilizer, and a first lens; the optical image stabilizer is configured to provide an optical stabilizing function; and the second camera unit comprises a monochrome image sensor and a second lens.

3. The electronic device of claim 2, if the ISO value is determined to be less than the first preset value, the processor is further configured to:
   activate the optical image stabilizer of the first camera unit;
   control the first camera unit to capture a fourth image; and
   store the fourth image in the storage.

4. The electronic device of claim 3, if the ISO value is greater than or equal to the first preset value, the processor is further configured to:
   detect whether an HDR function of the first camera unit is activated wherein
   if the HDR function is activated, activate the optical image stabilizer; and
   if the HDR function is not activated, control the first camera unit and the second camera unit to separately capture the first image and the second image, respectively, fuse the first image and the second image to generate the third image, and store the third image in the storage.

5. The electronic device of claim 3 further comprising a flash, and the processor is further configured to:
   if the ISO value is greater than or equal to the first preset value, detect whether the flash is activated wherein
   if the flash is activated, activate the optical image stabilizer; and
   if the flash is not activated, control the first camera unit and the second camera unit to separately capture the first image and the second image, respectively, fuse the first image and the second image to generate the third image, and store the third image in the storage.

6. The electronic device of claim 3 further comprising a flash, and the processor is further configured to:
   if the ISO value is greater than or equal to the first preset value, detect whether an HDR function of the first camera unit is activated wherein
   if the HDR function of the first camera unit is activated, activate the optical image stabilizer; and
   if the HDR function of the first camera unit is not activated, detect whether the flash is activated wherein
      if the flash is activated, activate the optical image stabilizer; and
      if the flash is not activated, control the first camera unit and the second camera unit to separately capture the first image and the second image, respectively, fuse the first image and the second image to generate the third image, and store the third image in the storage.

7. The electronic device of claim 6, and the processor is further configured to:

determine whether the ISO value is greater than or equal to a second preset value, the second preset value being greater than the first preset value;

if the ISO value is greater than or equal to the second preset value, detect whether the flash is activated;

if the flash is activated, activate the optical image stabilizer of the first camera unit flash is activated;

if the flash is not activated, detect whether the HDR function of the first camera unit is activated;

if the HDR function of the first camera is activated, activate the optical image stabilizer; and if the HDR function of the first camera unit is not activated, control the first camera unit and the second camera unit to separately capture the first image and the second image, respectively, fuse the first image and the second image to generate the third image, and store the third image in the storage.

8. An image capture control method for dual camera implementable in an electronic device comprising a camera assembly the method comprising:

detecting, if the camera assembly is activated, operational parameters of a first camera unit and a second camera unit of the camera assembly;

synchronizing the operational parameters of the second camera unit with the operational parameters of the first camera unit;

obtaining an ISO value of the camera assembly;

determining whether the ISO value is greater than or equal to a first preset value; and controlling, if the ISO value is greater than or equal to the first preset value, the first camera unit and the second camera unit to separately capture a first image and a second image, respectively, fusing the first image and the second image to generate a third image, and storing the third image in a storage of the electronic device.

9. The method of claim 8, further comprising:

activating an optical image stabilizer of the first camera unit if the ISO value is less than the first preset value; and controlling the first camera unit to capture a fourth image, if the ISO value is less than the first preset value, and storing the fourth image in the storage.

10. The method of claim 9 further comprising:

detecting, if the ISO value is greater than or equal to the first preset value, whether an HDR function of the first camera unit is activated;

activating the optical image stabilizer if the HDR function is activated; and controlling the first camera unit and the second camera unit, if the HDR function is not activated, to separately capture the first image and the second image, respectively, fusing the first image and the second image to generate the third image, and storing the third image in the storage.

11. The method of claim 9, further comprising:

detecting, if the ISO value is greater than or equal to the first preset value, whether a flash is activated;

activating the optical image stabilizer if the flash is activated;

controlling the first camera unit and the second camera unit, if the flash is not activated, to separately capture the first image and the second image, respectively, fusing the first image and the second image to generate the third image, and storing the third image in the storage.

12. The method of claim 9, further comprising:

detecting, if the ISO value is greater than or equal to the first preset value, whether an HDR function of the first camera unit is activated;

activating the optical image stabilizer if the HDR function of the first camera unit is activated;

detecting, if the HDR function of the first camera unit is not activated, whether a flash is activated;

activating the optical image stabilizer if the flash is activated; and controlling the first camera unit and the second camera unit, if the flash is not activated to separately capture the first image and the second image, respectively, fusing the first image and the second image to generate the third image, and storing the third image in the storage.

13. The method of claim 12, further comprising:

determining whether the ISO value is greater than or equal to a second preset value, the second preset value being greater than the first preset value;

detecting whether the flash is activated if the ISO value is greater than or equal to the second preset value;

activating the optical image stabilizer of the first camera unit if the flash is activated;

detecting whether the HDR function of the first camera unit is activated if the flash is not activated;

activating the optical image stabilizer if the HDR function of the first camera is activated; and controlling the first camera unit and the second camera unit, if the HDR function of the first camera unit is not activated, to separately capture the first image and the second image, respectively, fusing the first image and the second image to generate the third image, and storing the third image in the storage.

* * * * *